(12) United States Patent
Muthiah

(10) Patent No.: US 11,783,866 B2
(45) Date of Patent: Oct. 10, 2023

(54) DATA STORAGE DEVICE AND METHOD FOR LEGITIMIZED DATA TRANSFER

(71) Applicant: Western Digital Technologies, Inc., San Jose, CA (US)

(72) Inventor: Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 113 days.

(21) Appl. No.: 17/336,577

(22) Filed: Jun. 2, 2021

(65) Prior Publication Data

US 2022/0392497 A1 Dec. 8, 2022

(51) Int. Cl.
*G11B 27/36* (2006.01)

(52) U.S. Cl.
CPC .................... *G11B 27/36* (2013.01)

(58) Field of Classification Search
CPC ........................................... G11B 27/36
See application file for complete search history.

(56) References Cited

U.S. PATENT DOCUMENTS

| | | | |
|---|---|---|---|
| 4,847,840 A | 7/1989 | Jinguji | |
| 7,826,536 B2 | 11/2010 | Hannuksela et al. | |
| 8,650,226 B2 | 2/2014 | Bobick et al. | |
| 8,817,889 B2 | 8/2014 | Bouton et al. | |
| 9,878,241 B2 | 1/2018 | Perlman et al. | |
| 2011/0289267 A1 | 10/2011 | Flynn | |
| 2014/0136929 A1* | 5/2014 | Liu | G06F 11/1048 714/773 |
| 2016/0105689 A1 | 4/2016 | Sörlander et al. | |
| 2016/0182919 A1* | 6/2016 | Kanda | H04N 21/6373 375/240.25 |
| 2016/0357481 A1* | 12/2016 | Nam | G06F 3/061 |

OTHER PUBLICATIONS

International Search Report dated May 13, 2022 for International Application No. PCT/US2022/012865.
Written Opinion dated May 13, 2022 for International Application No. PCT/US2022/012865.
U.S. Appl. No. 16/708,091, filed Dec. 9, 2019, entitled "Storage System and Method for Video Frame Segregation to Optimize Storage."

* cited by examiner

Primary Examiner — Girumsew Wendmagegn
(74) Attorney, Agent, or Firm — Crowell & Moring LLP

(57) ABSTRACT

A data storage device and method for legitimized data transfer are provided. In one embodiment, a data storage device is provided comprising a memory and a controller. The controller is configured to receive a request from a host for a frame of media data; read the frame of media data from the memory, wherein the frame of media data comprises a plurality of fragments; determine whether a fragment of the plurality of fragments contains an error that would prevent playback of other fragments of the plurality of fragments, even if the other fragments do not contain an error; and in response to determining that the fragment contains the error, refrain from sending the other fragments to the host. Other embodiments are provided.

17 Claims, 6 Drawing Sheets

DATA STORAGE DEVICE AND METHOD FOR LEGITIMIZED DATA TRANSFER

BACKGROUND

A data storage device can store frames of media data (e.g., video and/or audio frames). The data storage device can send the frames of media data to a host for playback. The host can have error detection capabilities to detect and possibly correct a detected error in the frames of media data.

DETAILED DESCRIPTION

Overview

Figure 1A:
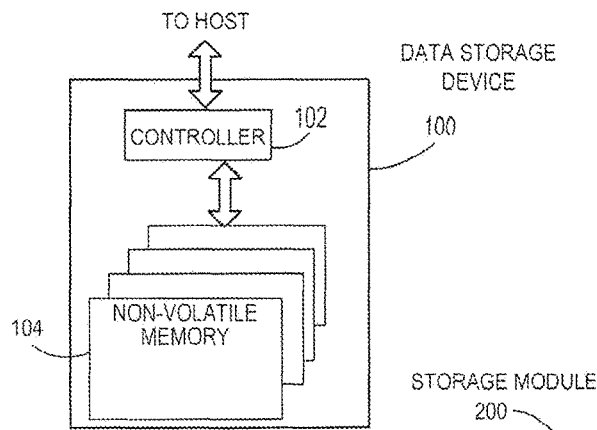
FIG. 1A is a block diagram of a data storage device of an embodiment.

By way of introduction, the below embodiments relate to a data storage device and method for legitimized data transfer. In one embodiment, a data storage device is provided comprising a memory and a controller. The controller is configured to receive a request from a host for a frame of media data; read the frame of media data from the memory, wherein the frame of media data comprises a plurality of fragments; determine whether a fragment of the plurality of fragments contains an error that would prevent playback of other fragments of the plurality of fragments, even if the other fragments do not contain an error; and in response to determining that the fragment contains the error, refrain from sending the other fragments to the host.

In some embodiments, the controller is further configured to inform the host that the other fragments will not be sent.

In some embodiments, the controller is further configured to send the other fragments to the host in response to receiving an override command from the host.

In some embodiments, the frame of media data comprises a video frame.

In some embodiments, the frame of media data comprises an audio frame.

In some embodiments, the controller is further configured to determine whether the frame of media data comprises an instantaneous decoder refresh (IDR) frame.

In some embodiments, the controller is further configured to: in response to determining that the frame of media data comprises an instantaneous decoder refresh (IDR) frame, refrain from sending, to the host, subsequent frames of media data until a next instantaneous decoder refresh (IDR) frame.

In some embodiments, the controller is further configured to: in response to determining that the frame of media data comprises an instantaneous decoder refresh (IDR) frame, refrain from sending, to the host, subsequent frames of media data until a beginning of a next group of picture (GOP).

In some embodiments, the controller comprises a media parser.

In some embodiments, the memory comprises a three-dimensional memory.

In another embodiment, a method is provided that is performed in a data storage device comprising a memory. The method comprises: receiving, from a requestor, a request for a data unit, wherein the data unit comprises a plurality of data sub-units; reading the plurality of data sub-units from the memory and sending them to the requestor until an error is found in one of the data sub-units that would prevent presentation of other data sub-units; and in response to finding the error in the one of the data sub-units, suspending sending the other data sub-units to the requestor.

In some embodiments, the data unit comprises a frame of media data.

In some embodiments, the frame of media data comprises a video frame.

In some embodiments, the frame of media data comprises an audio frame.

In some embodiments, the method further comprises informing the requestor of the suspension of the sending of the other data sub-units.

In some embodiments, the method further comprises resuming the sending of the other data sub-units in response to receiving an override command from the requestor.

In some embodiments, the method further comprises determining whether the data unit comprises an instantaneous decoder refresh (IDR) frame.

In some embodiments, the method further comprises in response to determining that the data unit comprises an instantaneous decoder refresh (IDR) frame, suspending sending subsequent data units until a next instantaneous decoder refresh (IDR) frame.

In some embodiments, the method further comprises in response to determining that the data unit comprises an instantaneous decoder refresh (IDR) frame, suspending sending subsequent data units until a next group of picture (GOP).

In another embodiment, a data storage device is provided comprising a memory; means for receiving a request from a host for a frame of media data; means for reading the frame of media data from the memory, wherein the frame of media data comprises a plurality of fragments; means for determining whether a fragment of the plurality of fragments contains an error that would prevent playback of other fragments of the plurality of fragments, even if the other fragments do not contain an error; and means for refraining from sending the other fragments to the host in response to determining that the fragment contains the error.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
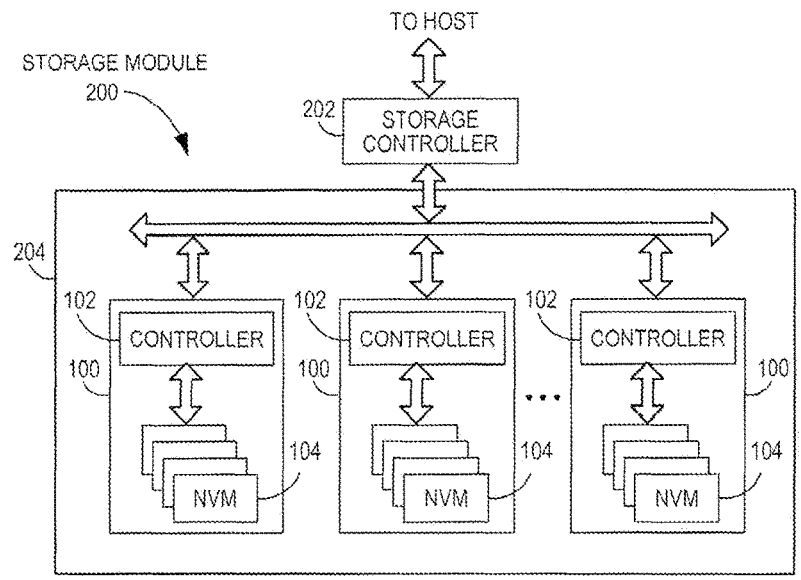
FIG. 1B is a block diagram illustrating a storage module of an embodiment.
Figure 1C:
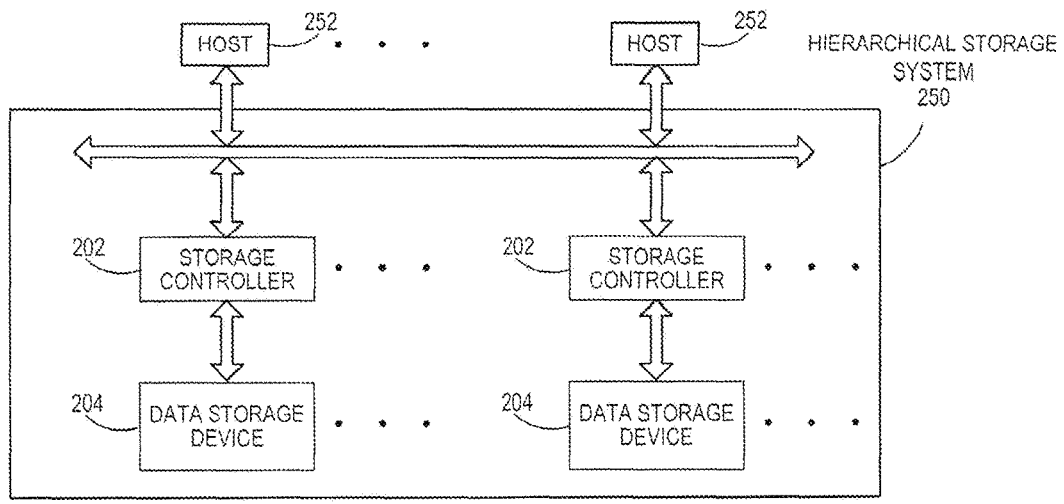
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
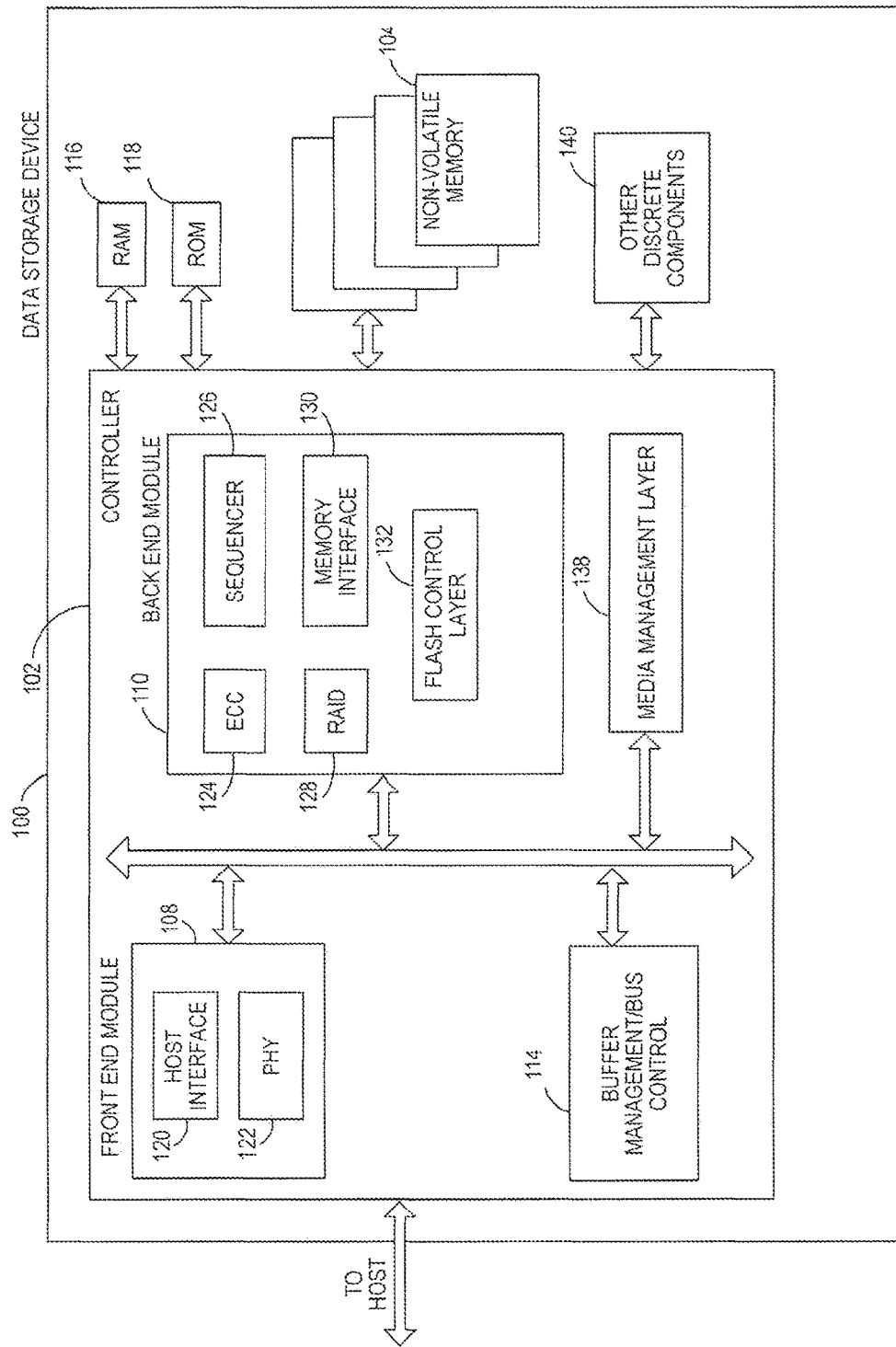
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
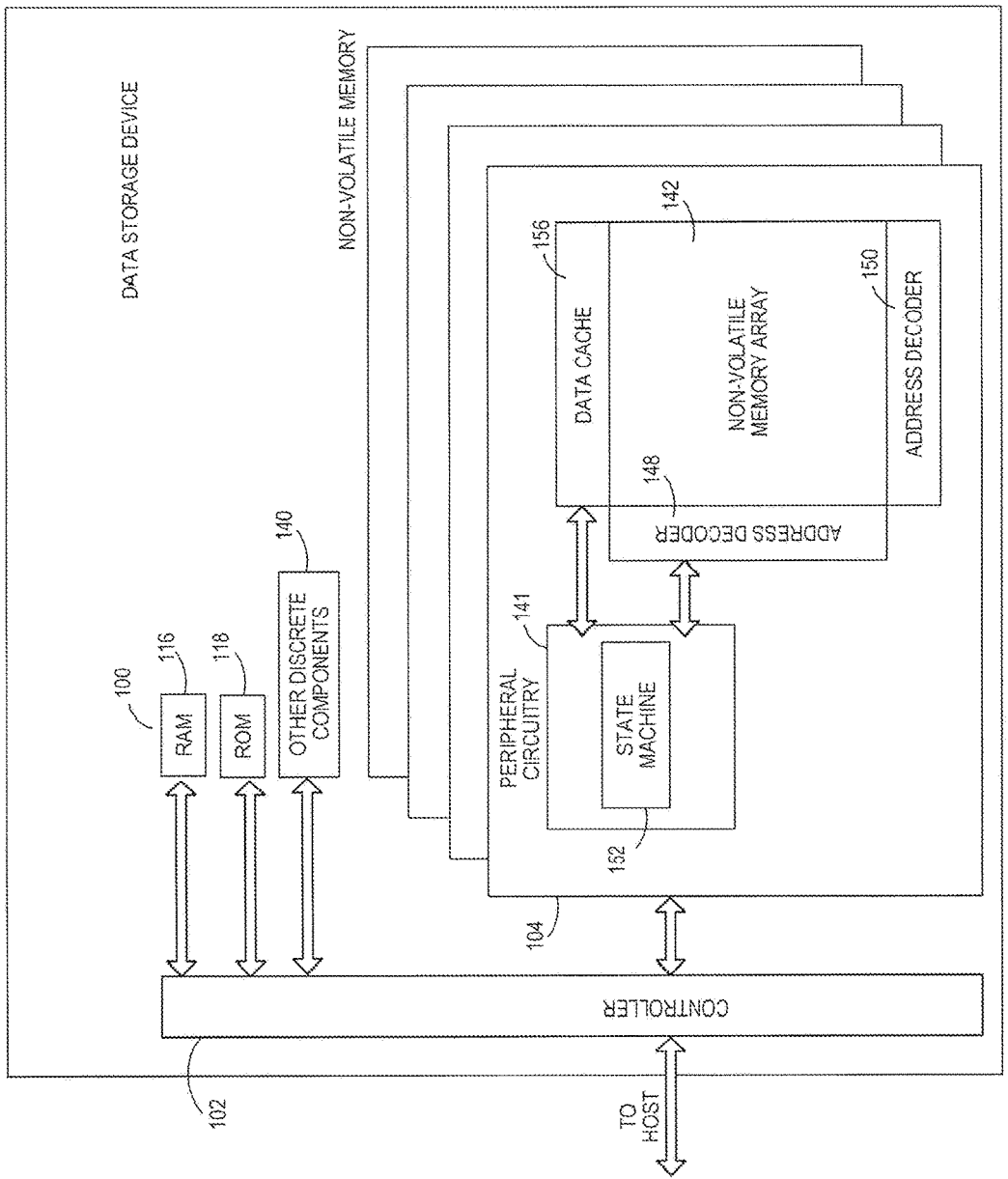
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
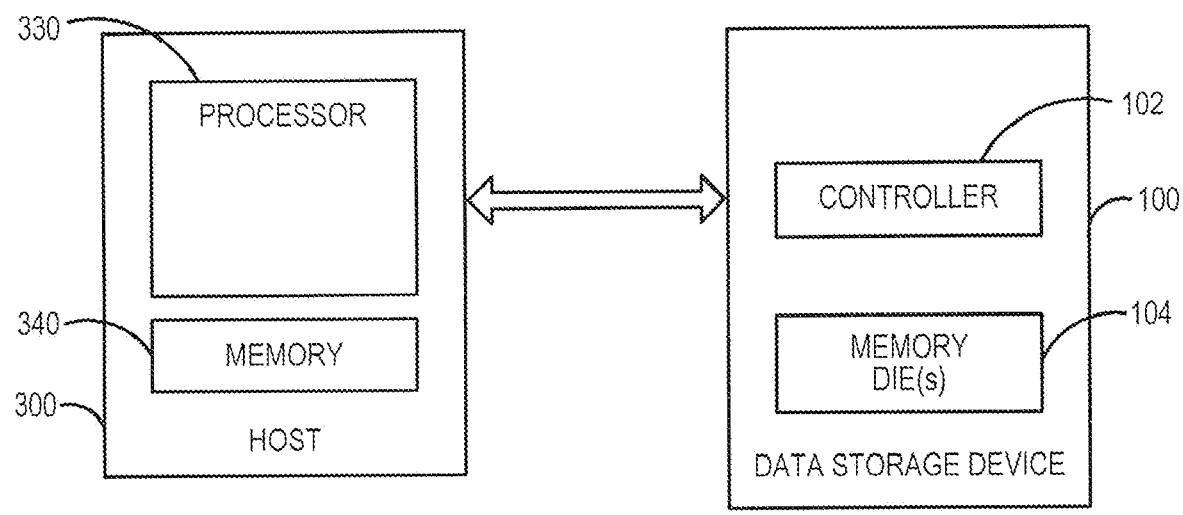
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300.

The data storage device 100 can store any suitable type of data unit, such as, but not limited to, video (e.g., a video frame), audio (e.g., an audio frame), image, or text data. A data unit can comprise a plurality of sub-units. For example, a data unit can be a frame of media data, and the sub-unit can be a fragment. The following paragraphs will illustrate one embodiment in terms of a video frame. However, it should be understood that this is merely an example and details of this example should not be read into the claims unless expressly recited therein.

In this example, the data unit takes the form of a media frame; more specifically, a video frame. The video frame in this example is part of a video stream (e.g., from a surveillance camera) that is in the Moving Picture Experts Group Transport Stream (MPEG-TS) format. In that format, different video frames are compressed using different compression algorithms, and such different video frames can be classified into different picture or frame types. Three of the major picture types are intra-coded picture frames (I-frames), predicted picture frames (P-frames), and bidirectional predicted picture frames (B-frames). I-frames are the least compressible but are independent in that they can be decoded without reference to other video frames. An I-frame can be a complete image, such as a Joint Photographic Experts Group (JPEG) image file. In contrast, a predicted picture frame (P-frame) (or delta frame) contains the changes in the image from the previous frame and requires reference to other video frames to be decompressed. However, P-frames are more compressible that I-frames. A bidirectional predicted picture frame (B-frame) contains differences between the current frame and both the preceding and following frames. Accordingly, B-frames provide the highest amount of data compression. Frames can be associated as a group of pictures (GOP), such as an intra-coded picture frames (I-frames) or instantaneous decoder refresh (IDR) frames When the data storage device 100 receives a video stream for storage, the controller 102 can use a video frame segregator to extract elementary streams (ESs) from the audio and video packed identifiers (PIDs) of each video program (i.e., the PIDs are extracted from the MPEG-TS, then the corresponding audio/video ESs are obtained from those program PIDs). To do this, the controller 102 can contain a media parser. The elementary streams are the outputs of the audio/video encoders of the cameras that contain only one kind of data (e.g., audio or video). The controller 102 can segregate and separately store video frames, as described in U.S. Pat. No. 10,841,645, which is hereby incorporated by reference.

A media playback system in the host 300 typically requires a complete frame (e.g., audio or video) to decode and present (e.g., on a display device and/or via a speaker). Audio frame sizes can range from a few bytes to a few kilobytes (KBs). Video frame sizes can range from a few KBs to approximately 200 KB based on resolution. Any small loss of encoded data can result in non-decodable frames that will not be rendered by the host 300. In such situations, the media playback system in the host 300 can discard the received incomplete encoded frame and stub it with a neighboring successfully-decoded video frame (for video) or a paused audio frame (for audio). Similarly, a loss of a fragment in an Instantaneous Decoder Refresh (IDR) frame makes decoding impossible not only for that particular video frame but also for delta frames that have dependency on the IDR frame. As such, a loss of a fragment of a frame can make it an incomplete frame and can make the rest of the data in that frame useless. As used herein, a "fragment" or "sub-unit" can refer to a portion of the data is any suitable granularity. For example, the size of a fragment in a frame can be the size of a flash management unit (FMU) or the unit in which the controller 102 reads from and/or writes to the memory 104.

The ECC capabilities of the data storage device 100 allow the data storage device 100 to detect and possibly correct an error in a fragment of a frame. However, if an uncorrectable error is a fragment occurs that would prevent the presentation of the frame (e.g., by virtue of an interrelationship and depending on the failed frame), the host 300 would not be able to play that video frame. Even if the data storage device 100 does not send the failed fragment, it would still send all the other frame fragments to the host 300. Since the host 300 would not be able to use these other frame fragments, such transmission is a waste of processing power and bus bandwidth between the host 300 and the data storage device 100.

The following embodiments can be used to address this problem. In short, the controller 102 of the data storage device 100 in one embodiment has knowledge of the interrelationship among the frame fragments. Because of this, if the controller 102 of the data storage device 100 knows that a failed fragment will prevent the host 300 from playing back the video frame, the controller 102 can refrain from sending the other frame fragments to the host 300, even though there are no errors in those other frame fragments.

These embodiments provide several advantages. For example, during a burst error recovery in the memory 104, time is saved by not accessing the neighboring data, which may not be required. Also, less work is needed for larger IDR frames (e.g., ~200 KB) for 4K video quality because of savings in network and device bandwidth. In general, these embodiments avoid transferring data sub-units if such are evaluated to be unusable to the playback requestor.

FIGS. 4-7 will now be discussed as an example of one implementation. It should be understood that this is merely an example and other implementations can be used. In general, in this example, the data storage device 100 receives a request for a data unit (here, a video frame), reads a plurality of data sub-units (here, frame fragments) from the memory 104, and sends them to the host 300 until an error is found in one of the data sub-units that would prevent presentation of other data sub-units. In response to finding the error, the controller 102 suspends sending the other data sub-units to the host 300.

Figure 4:
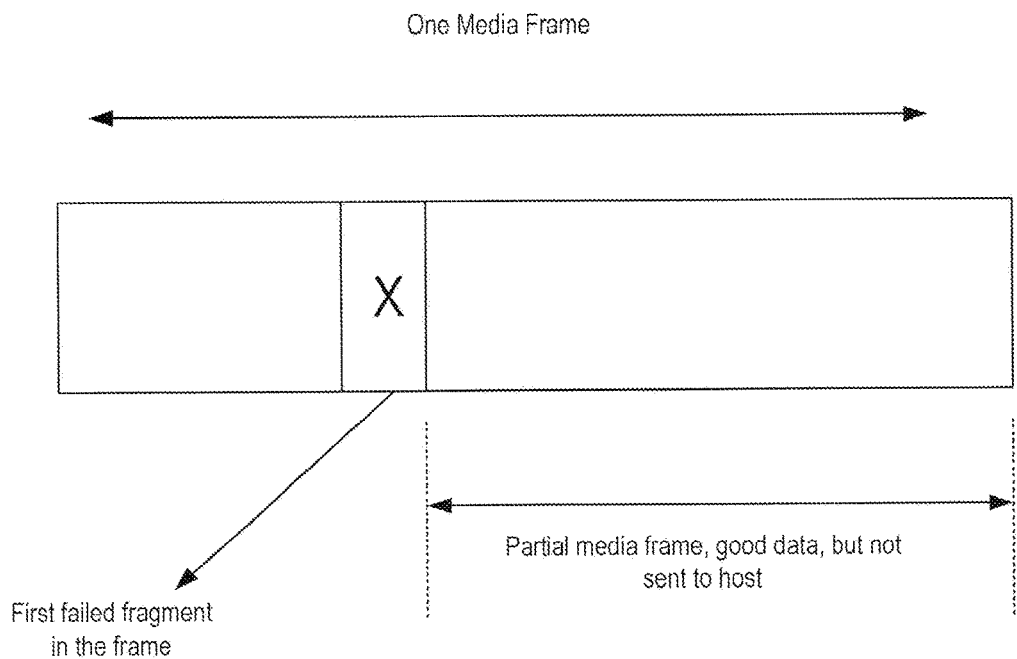
FIG. 4 is an illustration of a media frame of an embodiment that contains a failed fragment.
Figure 6:
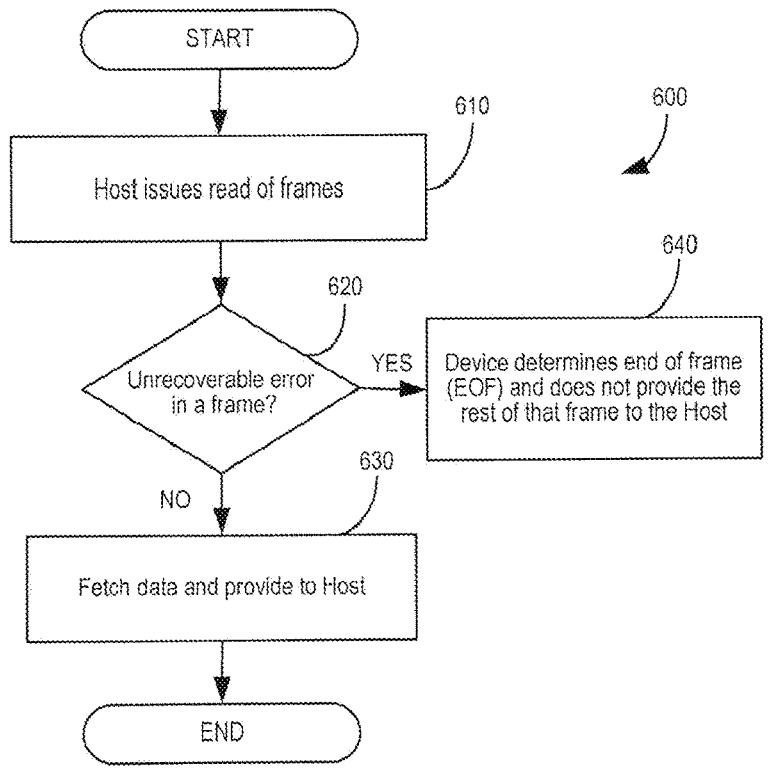
FIG. 6 is a flow chart of a method of an embodiment for suspending the transference of media frames to a host.

Turning now to FIGS. 4 and 6, as shown in the flow chart 600 in FIG. 6, after the host 300 issues a read command to the data storage device 100 for one or more frames stored in the memory 104 (act 610), the controller 102 reads a frame and determines if there is an error (e.g., an uncorrectable error) in a fragment of the frame that would prevent playback of other fragments of the frame, even if the other fragments do not contain an error (act 620). If no such error is found, the controller 102 returns the frame to the host 300 for playback (act 630). However, if such an error is found, the controller 102 determines the end of the frame and does not provide the fragments for the rest of the frame to the host 300 (act 640). This is shown diagrammatically in FIG. 4.

As shown by this example, the host 300 and the data storage device 100 can have a partial data transfer agreement where the data storage device 100 parses a frame (e.g., audio and/or video) and upon determining a read failure of a fragment, suspends sending the rest of that media frame data to the host 300, even though the rest of the media frame contains good data. This is because any loss in an encoded frame may not be playable by a playback system running in the host 300. As an example, in a 150 KB video frame, a loss of a single 4 KB storage fragment can make it unusable for all practical purposes. The data storage device 100 can leverage this fact and save time in accessing and transferring the rest of the frame data from the memory 104 to the host 300.

Some hosts may have error correction mechanisms, and erroneous data from the data storage device 100 may be able to be corrected by the host 300. However, low-cost and high-volume-segment hosts may prefer a reduced quality of service (frame drop) over using such correction mechanisms. In short, the agreement mandates that the frame data is evaluated in the data storage device 100 for usefulness before a decision is made to send the frame data.

Figure 5:
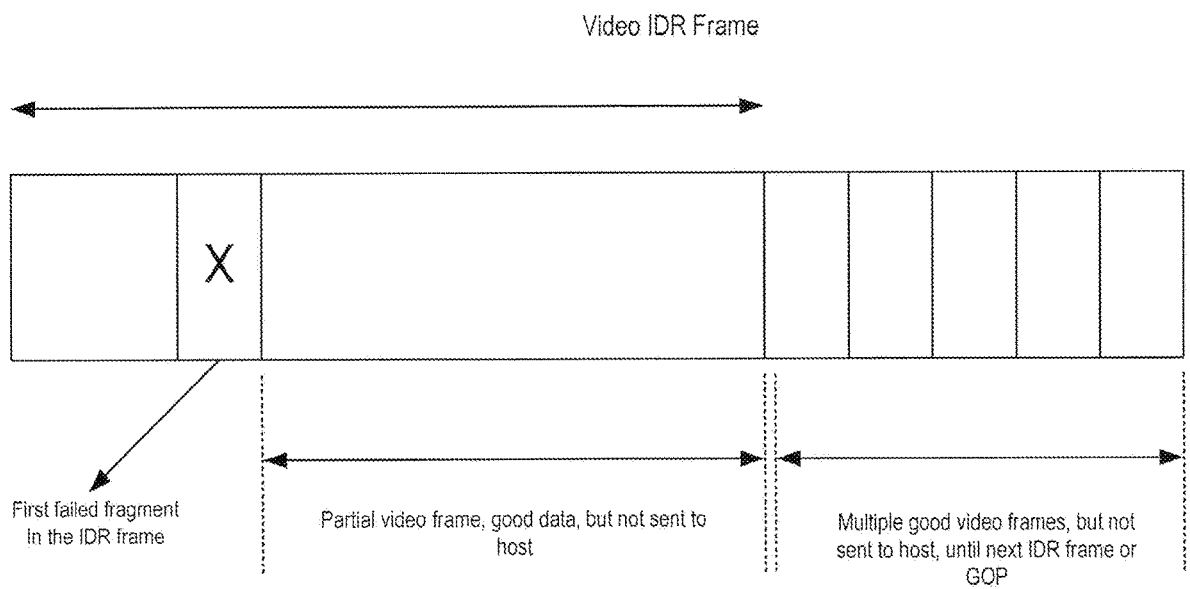
FIG. 5 is an illustration of a plurality of media frames of an embodiment, where one of the media frames contains a failed fragment.
Figure 7:
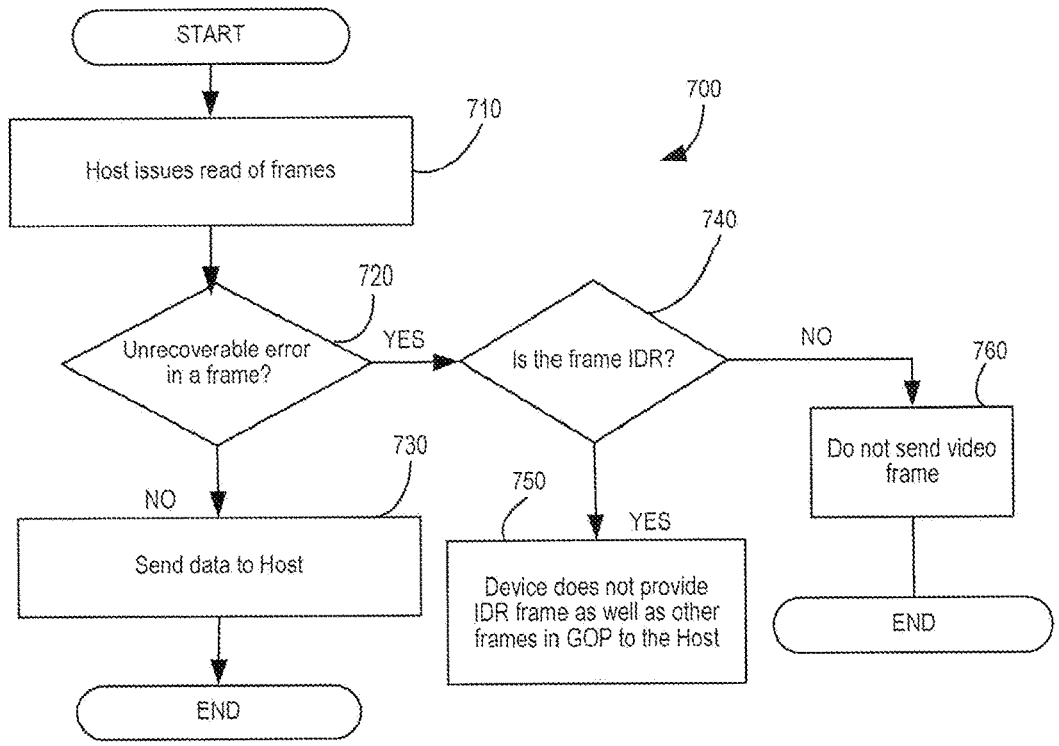
FIG. 7 is a flow chart of a method of an embodiment for suspending the transference of media frames to a host.

While the above example was in terms of a single frame, these embodiments can be applied to a group of frames (e.g., a group of pictures (GOP)), as illustrated in FIGS. 5 and 7. As shown in the flow chart 700 in FIG. 7, after the host 300 issues a read command to the data storage device 100 for one or more frames stored in the memory 104 (act 710), the controller 102 reads a frame and determines if there is an error (e.g., an uncorrectable error) in a fragment of the frame that would prevent playback of other fragments of the frame, even if the other fragments do not contain an error (act 720). If no such error is found, the controller 102 returns the frame to the host 300 for playback (act 730). However, if such error is found, the controller 102 determines if the frame is an IDR frame (act 740). If the frame is not an IDR frame, the controller 102 does not send the frame to the host 300 (act 760). If the frame is an IDR frame, the controller 102 not only does not provide the frame but also does not provide the other frames in the group of picture (GOP) or does not send a subsequent frame until the next IDR frame (act 750). This is shown diagrammatically in FIG. 5.

As shown by this example, in case the failed fragment is part of a video frame and it is determined that a failed fragment exists in an IDR frame, the controller 102 can suspend the memory sense and transfers of all the subsequent data (although good) until the next IDR frame or group of pictures (GOP). As an example, a loss of a single fragment in the IDR frame not only results in the inability for the host 300 to use that frame in any application but also all subsequent video frames until the next IDR or until the beginning of the next group of pictures (GOP). To enable better compression, only the IDR frame is sent as-is, as all subsequent frames have enormous dependency with the IDR frame for reconstruction. Thus, the loss of the IDR frame can result in a useless GOP. Given that there could be 12-15 video frames in a GOP, good savings are made by not transferring the unusable data. Accessing so much data from the memory 104 and transferring it to the host 300 after having heads-up information enables better resource management in both the host 300 and the data storage device 100.

To help understand this advantage, a typical frame size ratio for I frames:P frames:B frames is =4:2:1. So, P and B frames form a good proportionate of data transfers. Sometimes, P frames can be larger than I frames, although I frames are more important.

As discussed above, in one embodiment, the controller 102 of the data storage device 100 performs MPEG media parsing and understands audio and video frames and their boundaries. This enables the controller 102 to determine the type of the failed fragment and suspend sending the rest of the frame data as per the design of the data storage device 100. On suspension, the information is passed to the host 300, and the host 300 can flush any part of the frame received until then and stub accordingly.

In another embodiment, the controller 102 provides the host 300 with notice that the rest of the frame fragments/frames will not be sent (partial frame data suspension), and the host 300 can provide an override command to the data storage device 100 to receive those items. Using such host-defined mechanism allows the host 300 to decide when to appropriately stub video/audio frame according to its audio-visual system design for its playback applications. This embodiment takes into account the fact that in some applications, the host 300 may be willing to accept the rest of the frame although unusable (e.g., for backward compatibility purposes or for use with a different error recovery model). In some cases, the host error correction model may be strong enough to recover the frame.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
a memory; and
a controller configured to:
   receive a request from a host for a frame of media data;
   read the frame of media data from the memory, wherein the frame of media data comprises a plurality of fragments;
   determine whether a fragment of the plurality of fragments contains an error that would prevent playback of other fragments of the plurality of fragments, even if the other fragments do not contain an error; and
   in response to determining that the fragment contains the error:
      refrain from sending the other fragments to the host; and
      inform the host that the other fragments will not be sent.

2. The data storage device of claim 1, wherein the controller is further configured to send the other fragments to the host in response to receiving an override command from the host.

3. The data storage device of claim 1, wherein the frame of media data comprises a video frame.

4. The data storage device of claim 1, wherein the frame of media data comprises an audio frame.

5. The data storage device of claim 1, wherein the controller is further configured to determine whether the frame of media data comprises an instantaneous decoder refresh (IDR) frame.

6. The data storage device of claim 5, wherein the controller is further configured to:
in response to determining that the frame of media data comprises an IDR frame, refrain from sending, to the host, subsequent frames of media data until a next IDR frame.

7. The data storage device of claim 5, wherein the controller is further configured to:
in response to determining that the frame of media data comprises an IDR frame, refrain from sending, to the host, subsequent frames of media data until a beginning of a next group of pictures (GOP).

8. The data storage device of claim 1, wherein the controller comprises a media parser.

9. The data storage device of claim 1, wherein the memory comprises a three-dimensional memory.

10. A method comprising:
performing the following in a data storage device comprising a memory:
   receiving, from a requestor, a request for a data unit, wherein the data unit comprises a plurality of data sub-units;
   reading the plurality of data sub-units from the memory and sending them to the requestor until an error is found in one of the data sub-units that would prevent presentation of other data sub-units;
   in response to finding the error in the one of the data sub-units, suspending sending the other data sub-units to the requestor;
   informing the requestor of the suspension of the sending of the other data sub-units; and
   resuming the sending of the other data sub-units in response to receiving an override command from the requestor.

11. The method of claim 10, wherein the data unit comprises a frame of media data.

12. The method of claim 11, wherein the frame of media data comprises a video frame.

13. The method of claim 11, wherein the frame of media data comprises an audio frame.

14. The method of claim 10, further comprising determining whether the data unit comprises an instantaneous decoder refresh (IDR) frame.

15. The method of claim 14, further comprising:
in response to determining that the data unit comprises an IDR frame, suspending sending subsequent data units until a next IDR frame.

16. The method of claim 14, further comprising:
in response to determining that the data unit comprises an IDR frame, suspending sending subsequent data units until a next group of pictures (GOP).

17. A data storage device comprising:
a memory;
means for receiving a request from a host for a frame of media data;
means for reading the frame of media data from the memory, wherein the frame of media data comprises a plurality of fragments;
means for determining whether a fragment of the plurality of fragments contains an error that would prevent playback of other fragments of the plurality of fragments, even if the other fragments do not contain an error; and
means for, in response to determining that the fragment contains the error:
refraining from sending the other fragments to the host; and
informing the host that the other fragments will not be sent.

* * * * *